United States Patent [19]

Wawra et al.

[11] Patent Number: 5,389,161

[45] Date of Patent: Feb. 14, 1995

[54] PROCESS FOR PHOSPHATING STEEL PARTS TO IMPROVE CORROSION AND WEAR RESISTANCE

[75] Inventors: Joseph Wawra, Saint-Just/Saint-Rambert; Jean-Marc Poirson, Saint-Etienne, both of France

[73] Assignee: Centre Stephanois de Recherches Mecaniques Hydromecanique et Frottement, Andrezieux-Boutheon, France

[21] Appl. No.: 18,853

[22] Filed: Feb. 8, 1993

[30] Foreign Application Priority Data

Mar. 10, 1992 [FR]  France ................. 92 02826

[51] Int. Cl.[6] .............. C23C 22/78; C23C 8/56
[52] U.S. Cl. ...................... 148/242; 148/254; 148/218
[58] Field of Search .............. 148/242, 254, 255, 218

[56] References Cited

U.S. PATENT DOCUMENTS

| | | |
|---|---|---|
| 3,912,547 | 10/1975 | Gaucher et al. ............ 148/6.11 |
| 4,006,043 | 2/1977 | Gaucher et al. ............ 148/27 |
| 4,448,011 | 5/1984 | Grellet .............. 148/242 |

FOREIGN PATENT DOCUMENTS

| | | |
|---|---|---|
| 1057237 | 3/1954 | France . |
| 2050754 | 4/1971 | France . |
| 2171993 | 9/1973 | France . |
| 2853542 | 6/1980 | Germany . |
| 1647 | 1/1978 | Japan . |
| 0131358 | 8/1992 | Japan ................ 148/242 |
| 926070 | 5/1982 | U.S.S.R. . |

OTHER PUBLICATIONS

Kawksaki Seitetsu K. K., "Production of dead soft cold rolled steel sheet having excellent phosphate treatability", Patent Abstracts of Japan, Mar. 20, 1986, vol. 10, No. 71.

Shin Nippon Seitetsu K. K., "Cold rolled steel sheet having excellent phosphate treatability and its production", Patent Abstracts of Japan, May 11, 1985, vol. 9 No. 108.

*Primary Examiner*—Sam Silverberg
*Attorney, Agent, or Firm*—Young & Thompson

[57] ABSTRACT

After preliminary treatment of their surfaces, the parts are brought into contact within a solution containing, essentially, protons, phosphate anions and cations chosen from $Ca^{2+}$, $Sn^{2+}$ and $Mn^{2+}$. The preliminary treatment results in the formation, on the surface, of a layer that comprises, per 1000 atoms, at least 150 atoms of free iron and from 5 to 150 atoms of sulphur, and has a porosity defined by an actual surface area to macroscopic surface area ratio of at least 20. According to an embodiment, these surface characteristics are obtained by nitriding in a bath of molten salts containing sulphur-containing species. According to a second embodiment, these surface characteristics are obtained by nitriding in a bath of molten salts followed by a conventional sulphiding operation. According to a third embodiment, these surface characteristics are obtained by depositing metal, followed by a conventional sulphiding operation.

17 Claims, No Drawings

PROCESS FOR PHOSPHATING STEEL PARTS TO IMPROVE CORROSION AND WEAR RESISTANCE

BACKGROUND OF THE INVENTION

1. Field of the Invention

The present invention relates to a process for phosphating steel parts to improve corrosion and wear resistance and, more particularly, to a preliminary surface treatment of the parts.

2. Description of the Prior Art

The performances of parcels that have undergone phosphating, whatever their application, are known to depend essentially upon two characteristics: crystallinity and the quality of adherence of the phosphated layer to a substrate.

These two characteristics depend directly on the quality of the preparation of the metal surface prior to the phosphating operation properly speaking. The physical chemical state of this surface in fact conditions its reactivity in respect of the active agents of the phosphating bath, as well as the epitaxial growth of the layer of complex phosphates.

Generally speaking, it is sought, then, to achieve fine, regular crystallization, resulting in a layer as dense as possible.

Out of the whole of the layer building process, it is the germination stage which plays the predominant role in achieving this effect. That is why techniques have been sought after which are capable of permitting maximum activation of the metal surface and of creating thereon the largest possible number of germination sites. A certain number of solutions are known.

One of these solutions consists in electrolytically polishing the steel substrate, this being followed by depassivation and sanding with a cutting abrasive.

Another solution is to "seed" the surface with crystallization germs, for example, by pre-rinsing the untreated steel with a suspension of titanium salts.

Yet another solution is to adapt the composition of the phosphating bath, for example by using additives such as certain nickel or cadmium salts.

Finally, there are also known so-called "spraying" type techniques, wherein acicular crystallization is induced through the action of jets.

It is known, furthermore, that not all steels can be phosphated, particularly those containing over 5% of metallic addition elements, such as Cr, Mo and Ni, as layers with low coherence would be obtained in this case. This effect can be attenuated, to a certain extent, by specially adjusting the acidity of the phosphating bath, or by prior depassivation.

In conventional applications, and when the parts are not required to present exceptional qualities, the aforementioned techniques given industrialists satisfactory results, for example corrosion resistance permitting from 50 to 100 hours' exposure to a salt mist environment or even, for example, an improvement in running-in conditions during the very first hours thereof.

On the other hand, when corrosion and wear resistance requirement are more severe, these solutions prove inadequate. Other processes have thus been developed.

One example is provided in German Patent Application No. 28 53 542, which teaches that good protection against corrosion can be obtained for steel parts by initially nitriding the parts and then, in a second step, phosphating them, and, more particularly, phosphating them using manganese.

Variants of this technology are described in Japanese Patent Application No. 53-001647 and Soviet Union Patent Application No. 926070.

Here again, however, in view of the constantly increasing technical requirements with regard wear and corrosion resistance, the properties conferred on the parts by these processes also often prove inadequate nowadays. They cannot, for instance, guarantee the 400 hours' resistance to a salt mist environment desired by the automotive industry. In the case of gears made of carbonitrided steel subjected to severe stress, the surface phosphating is entirely removed in barely more than ten hours or so, that is to say in approximately the time required for running-in, with the resulting loss of the beneficial effect of the phosphated layer on the retention, and hence the stability, of lubricant films.

OBJECT AND SUMMARY OF THE INVENTION

An object of the present invention is to remedy these shortcomings by making it possible:

to achieve very much better surface activation, with a proliferation of the germination sites, resulting in the perfectly reliable and reproducible phosphated layers that are very dense, finely crystallized and very adherent;

to extend the phosphating substrate to other than nitrided layers, as was the case in the process described in German Patent Application No. 28 53 542;

and, finally, to broaden the field of application of phosphating to other steels, than those containing less than 5% of metallic addition elements.

For this purpose, the present invention provides a process for phosphating steel parts to improve corrosion and wear resistance, in which the parts undergo a preliminary surface treatment, and thereafter are brought into contact with a solution containing, essentially, protons, phosphate anions and cations selected from the group consisting of $Ca^{2+}$, $Zn^{2+}$ and $Mn^{2+}$, wherein the preliminary treatment is carried out in a salt bath in the presence of sulphur-containing species causing the formation of a layer of iron compounds with at least one element selected from the group consisting of carbon and nitrogen, and reciprocal thermal diffusion of the compounds of the layer and of the iron of the part so that the surface of the part comprises, per 1000 atoms, at least 150 atoms of free iron and 5 to 150 atoms of sulphur, and has a porosity defined by an actual surface area to macroscopic surface area ratio from 20 to 40.

In the preliminary or pre-treatment, there are thus carried out, simultaneously, a thermochemical treatment involving diffusion between the iron of the substrate and one or more filler metalloids of the nitrogen and/or carbon type, and the addition of sulphur-containing species.

According to one variant, in the preliminary or pre-treatment, the addition of sulphur-containing species is carried out independently in a second step. Just as in the above-mentioned process, thermochemical diffusion is effected initially between the iron of the substrate and one or more filler metalloids of the nitrogen and/or carbon type, this being followed by a conventional sulphiding operation.

According to another variant, the sulphur-containing species are also added in a second step through a sulphiding operation and the diffusion step is carried out by depositing a metal capable of forming intermetallic compounds with iron, with reciprocal thermal diffusion of the intermetallic compounds and of the iron of the part, this metal being, for example, chromium or tin.

Thermochemical diffusion operations carried out in baths of molten salts, with or without sulphur-containing species, are carried out, for example, according to the teachings of U.S. Pat. Nos. 3,912,547 and 4,006,043, incorporated herein by reference, wherein steel parts are immersed in a bath comprising cyanates, carbonates and/or $S^{2-}$ ions.

The sulphiding operation is carried out, for example, according to the teachings of French Patent Application No. 2,050,754 in baths of molten salts.

It can also be carried out by ion implantation of sulphur.

Thermal diffusion by depositing a metal is carried out in accordance with the conventional, so-called case hardening techniques.

Thanks to the process of the invention, a surface layer is obtained, after the pre-treatment, which has the following three characteristics:

it contains active free iron, in a proportion of at least 150 atoms per 1000 atoms;

it also contains sulphur, free or combined, in a proportion of 5 to 150 atoms per 1000 atoms;

and its actual area is between 20 to 40 times greater than its apparent area, without it being powdery or of foam consistency.

The invention results from the unexpected synergetic effect due to the combination of these three characteristics.

The present invention will be more clearly understood in the light of the following description illustrated by examples of experiments.

DETAILED DESCRIPTION OF PREFERRED EMBODIMENTS OF THE INVENTION

EXAMPLE 1

Testing Corrosion Resistance

A series of experiments is carried out on ground rings made of 0.38% carbon non-alloy steel with a diameter of 35 mm and a height of 15 mm.

In each experiment, a different pre-treatment is carried out, resulting in the formation of surface layers having different characteristics.

The parts are then subjected to phosphating under the same operating conditions, by immersion for 15 minutes in a zinc/iron type bath, at a temperature of 90° C., the composition of the bath being as follows:

12 g/l of $P_2O_5$
5 g/l of $NO_3-$
6 g/l of $Zn^{2+}$
2,5 g/l of $Fe^{2+}$

The corrosion resistance of the parts treated in a standardized salt mist environment is then measured.

Experiment 1:

The steel rings are immersed in a sulfonitriding bath in accordance with the teachings of U.S. Pat. Nos. 3,912,547 and 4,006,043, containing 37% by weight cyanate ions, of alkaline carbonate ions and 10 ppm of $S^{2-}$ ions, the temperature of the molten salts being 570° C., and the immersion time being of 90 minutes. Upon removal from the bath, the parts are washed in water so as to rid them from the surrounding gangue of salts, after which they are dried.

This treatment leads to the formation, on the surface of the parts, of a nitrided layer in accordance with the present invention having the following characteristics:

the outer part is porous, the actual surface area of the rings being approximately 25 times greater than their apparent surface area;

the outer part contains sulphur-containing species in a proportion of 20 atoms of sulphur per 1000;

the outer part also contains free iron, in a proportion of 300 atoms per 1000.

The parts are then phosphated, after which they are subjected to corrosion tests in a standardized salt mist environment. They are found to withstand these conditions for at least 700 hours and, in certain cases, more than 1200 hours, the average over a series of 50 parts being 900 hours.

Experiment 2:

The operating conditions are those of the pre-treatment of Experiment 1, all things being equal, except that the nitriding bath is sulphur-free.

The nitriding leads to the formation, on the surface, of a layer that:

contains approximately 350 atoms per 1000 of free iron; and has an actual surface area 20 times greater than the apparent surface area.

By comparison with the nitrided layer obtained under the conditions of Experiment 1, the layer does not include any sulphur-containing species, but the other characteristics, free iron content and actual surface area in relation to apparent area, are of the same order of magnitude.

The phosphated parts are found to have a resistance to corrosion in a salt mist environment not exceeding 350 hours.

This experiment clearly demonstrates the importance of the presence of sulphur in the outer layer as, in the absence of sulphur-containing species, resistance drops from 900 to 350 hours.

Experiment 3:

The rings undergo chemical pickling followed by sandblasting, so that their actual surface area is 2 to 3 times greater than their apparent surface area.

After phosphating, the tests in a salt mist environment demonstrate a corrosion resistance of 70 hours on average, which is in conformity with the results currently obtained using conventional techniques.

This experiment shows the considerable improvement of corrosion resistance with the invention, by comparison with the traditional techniques as, in Experiment 1, corrosion resistance values of up to 1200 hours in a salt mist environment are obtained.

Experiment 4:

Using the parts that have undergone Experiment 3, which have been chemically pickled and then sandblasted, sulphiding is next carried out (in accordance with the teachings of French patent No.2050 754 ) by immersion in a bath of molten salts containing potassium thiocyanate, sodium thiocyanate and potassium cyanide and/or sodium, the duration of this immersion being reduced to a few seconds only, instead of the conventional 2 to 3 minutes, so as to carry out, not total sulphiding, but to obtain a surface sulphur content confined to approximately 100 atoms per 1000.

The salt mist tests demonstrate a corrosion resistance of not more than 250 hours.

Observations:

These experiments clearly confirm the synergetic effect produced by the three characteristics sought after for the surface prior to phosphating, relating to the free iron content, the sulphur content and the actual to apparent surface area ratio.

By adopting the conditions according to the invention, very much higher corrosion resistance values are obtained, the increase being from approximately 300 hours' to 900 hours' resistance on average, and even as much as 1200 hours.

It will be noted, however, that, in the case of Experiment 4, non-observance of the specification concerning the ratio of the actual to apparent surface areas results in a performance that is far below the 900 hour average of the first experiment.

Example 2

Testing Wear Resistance

The tests are conducted on hardened tempered 35 NC 6 steel gears with a pitch diameter of 240 mm and a modulus of 8, the gears being operated on a suitable machine rotating at 1660 RPM with a torque transmission of 450 mN.

A first experiment in the absence of any surface treatment of the gears indicates that running-in conditions are not satisfactory. After 15 hours' operation, the tooth flanks are found to show signs of extensive scoring.

In a second experiment, the gears are subjected to a conventional pre-treatment before phosphating. The phosphated parts, after the same 15-hour period of operation, have perfectly smooth tooth flanks. This time, running-in has taken place under satisfactory conditions. On the other hand, the entire phosphated layer is observed to have disappeared, leaving the steel bare. It is also noted that, as long as there is suitable lubrication, the gears can continue to function normally. However, in case of a lubrication failure, for example as a result of its being momentarily interrupted, a very swift deterioration in friction properties is observed: vibrations occur and the flanks of the teeth are deeply scored.

Finally, in a last experiment, phosphating is carried out according to the invention, that is to say with a preliminary surface treatment by nitriding with the addition of sulphur, under the same conditions as in Experiment 1, Example 1. The life of the phosphated layer is then found to be very substantially improved. After 150 hours of operation, the phosphated layer of the gears has still not been worn off. It can thus continue to carry out its function. Thus, in case of a momentary lubrication failure, the surface condition of the teeth remains unimpaired and, once the normal lubrication process resumes, friction is once again under satisfactory conditions.

Example 3

The same rings are used as in Example 1 and, prior to phosphating, a preliminary treatment involving another thermal diffusion technique is carried out, the object being to obtain identical characteristics of the surface layer.

In a first step, chromium is thermochemically diffused in the steel, according to the so-called chromizing process, also known as chromium case hardening, at a temperature of 1000° C.

One thus obtains a layer of mixed carbides containing free iron the finely porous outer part of which has a large specific surface area.

In a second step, this layer is enriched with sulphur, using the so-called ion implantation technique, with a high energy ion beam, following, or accompanying, this implantation with a heat treatment at a temperature of 250° C. for 30 minutes.

The parts thus prepared are then phosphated under the same conditions as in Example 1.

The phosphated parts then undergo the corrosion tests in a standardized salt mist environment. No pitting corrosion is observed after 1000 hours have elapsed.

By comparison, the parts that have been chromium coated in the same way, but that have not undergone sulphur implantation, do not withstand corrosion for more than 300 to 400 hours.

Example 4

Tests are conducted on steel, cylindrically shaped fixing pins for steam turbine blades which ensure the connection between the hub and the blades.

In service, these parts are subjected to severe fretting corrosion as well as corrosion by steam. They also have to resist seizure and scoring in the course of fitting and dismantling operations, whether when first installed or at the time of periodic inspections.

A phosphating treatment carried out on these pins under conventional conditions enables them to resist corrosion at best for several tens of hours and it only ensures protection against friction damage when they are mounted for the first time.

The pins are made to undergo phosphating preceded by the following treatment. Tin is electrolytically deposited, this being followed by a heat treatment in a neutral nitrogen atmosphere, so as to produce on the surface of the parts a metallic finely porous diffusion layer containing free iron, which is slightly enriched with sulphur by one of the means described in the previous examples (ion implantation or thermal diffusion).

The parts are then found to have a service life of several hundreds, or even several thousands, of hours, with periodical mounting and dismantling operations.

In view of the results of the experiments described in these examples, an attempt has been made to trace the phenomena observed back to the probable theoretical mechanisms.

The reaction mechanism of phosphating is relatively complex; broadly speaking, first it involves phosphoric acid attacking the metal forming the part to be treated (generally the iron of the steel), followed by the precipitation of insoluble phosphates, generally of the $(PO_4)_2 Me_3$ type (Me being Zn, Ca or Mn), but also $(HPO_4)_2 Me_2$, $(HPO_4)_2 Fe_2$, $(HPO_4)_2 MeFe$.

Heterogeneous liquid/solid phase reactions which are all the simpler the more the solid phase is divided. Whence the advantage of the surface of the part to be treated having numerous fine pores, that is to say a large specific surface area.

In practice, however, there is a porosity threshold beyond which the cohesion of the surface layers is no longer sufficient to enable the part to perform its mechanical and tribological functions.

The presence of active iron is also essential to ensure the attacking reaction between the iron and the phosphoric acid contained in the bath.

Among those techniques at the disposal of the practitioner in order to obtain the aforementioned two effects simultaneously, those based on thermochemical mechanisms of metal and/or metalloid diffusion are of considerable industrial interest as they combine ease of implementation with a low operating cost.

In these techniques, the presence of active iron in the vicinity of the surface is linked with the migration of this element through the diffusion layer from the steel substrate. As to the fine surface pores, these are generated by the KIRKENDALL effect, that is to say the effect associated with the difference in the mobility of the atoms of the elements forming part of the diffusion layer.

As to the function of the sulphur, the basic concept behind its interpretation is connected with iron phosphating, which brings into play the oxidation (in the sense of the degree of oxidation) of the iron and the combining of the oxidated iron with the phosphate ions.

One can thus suppose that the phosphating operation is facilitated by carrying it out on a previously oxidated surface, wherein the iron would be stabilized by a species leading to a reversible reaction, so that the subsequent iron-phosphorus combination is obtained by means of an exchange reaction: in this way, a large proportion of the energy used to phosphate the iron would be saved.

It will be noted that the above stabilizing species could not be the oxygen itself as it would result in compounds that were too thermodynamically stable.

On the other hand, sulphur is an advantageous intermediary, the reasons therefor being as follows:
- the iron-sulphur compounds, of the $Fe_{(1-x)}S$ type with $x \leq 1$, which exist in a large range of the Fe/S ratio, correspond to an oxidated form of the metal;
- they also correspond to a reversible equilibrium in which the sulphur can easily be exchanged with another element or ion electron donor;
- they can easily be attacked by acids or reduced by metals such as zinc, so that we can consider that their passage through the phosphating bath frees them from the substrate and that they play only an intermediary role, analogous with that played by catalysts in chemical reactions.

What we claim is:

1. Process for phosphating steel parts to improve corrosion and wear resistance, in which the parts undergo a preliminary surface treatment, and thereafter are brought into contact with a solution containing, essentially, protons, phosphate anions and cations selected from the group consisting of $Ca^{2+}$, $Zn^{2+}$ and $Mn^{2+}$, wherein the preliminary treatment is carried out in a salt bath in the presence of sulphur-containing species causing the formation of a layer of iron compounds with at least one element selected from the group consisting of carbon and nitrogen, and reciprocal thermal diffusion of the compounds of the layer and of the iron of the part so that the surface of the part comprises, per 1000 atoms, at least 150 atoms of free iron and 5 to 150 atoms of sulphur, and has a porosity defined by an actual surface area to macroscopic surface area ratio of from 20 to 40.

2. Process according to claim 1, wherein the bath of salts comprises alkaline carbonates and cyanates, with 10 ppm of sulphur $S^{2-}$.

3. Process according to claim 2, wherein, with the bath of salts at a temperature of 570° C.±15° C., the parts are immersed therein for 90 minutes±15 minutes.

4. Process for phosphating steel parts to improve corrosion and wear resistance, in which the parts undergo a preliminary surface treatment, and thereafter are brought into contact with a solution containing, essentially, protons, phosphate anions and cations selected from the group consisting of $Ca^{2+}$, $Zn^{2+}$ and $Mn^{2+}$, wherein the preliminary treatment comprises a first step carried out in a salt bath for causing the formation of a layer of iron compounds with at least one element selected from the group consisting of carbon and nitrogen and reciprocal thermal diffusion of compounds of the layer and of the iron in the part, and a second, sulphiding step so that the surface of the part comprises, per 1000 atoms, at least 150 atoms of free iron and 5 to 150 atoms of sulphur, and has a porosity defined by an actual surface area to macroscopic surface area ratio of 20 to 40.

5. Process according to claim 4, wherein the salt bath comprises alkaline carbonates and cyanates.

6. Process according to claim 5, wherein, with the salt bath at a temperature of 570° C.±15° C. the parts are immersed therein for 90 minutes±15 minutes.

7. Process according to claim 4, wherein the sulphiding step comprises electrolysis in a bath of molten alkaline thiocyanates.

8. Process according to claim 7, wherein the sulphiding step comprises diffusion at at least 180° C.

9. Process according to claim 4, wherein the sulphiding step is carried out through ion implantation of sulphur.

10. Process according to claim 9, wherein the sulphiding step comprises diffusion at at least 180° C.

11. Process for phosphating steel parts to improve corrosion and wear resistance, in which after a preliminary surface treatment of the parts, the parts are brought into contact with a solution containing, essentially, protons, phosphate anions and cations selected from the group consisting of $Ca^{2+}$, $Zn^{2+}$ and $Mn^{2+}$, wherein the preliminary treatment comprises a step of depositing a metal capable of forming intermetallic compounds with the iron together with reciprocal thermal diffusion of the intermetallic compounds and the iron in the part, and thereafter a sulphiding step, so that the surface of the part comprises, per 1000 atoms, at least 150 atoms of free iron and from 5 to 150 atoms of sulphur, and has a porosity defined by an actual surface area to macroscopic surface area ratio from 20 to 40.

12. Process according to claim 11, wherein the metal is chromium, and diffusion is carried out in the region of 1000° C.

13. Process according to claim 11, wherein the metal is electrolytically deposited tin, and diffusion is carried out at between 300° C. and 600° C. in a nitrogen atmosphere.

14. Process according to claim 11, wherein the sulphiding step comprises electrolysis in a bath of molten alkaline thiocyanates.

15. Process according to claim 14, wherein the sulphiding step comprises diffusion at at least 180° C.

16. Process according to claim 11, wherein the sulphiding step is carried out through ion implantation of sulphur.

17. Process according to claim 16, wherein the sulphiding step comprises diffusion at at least 180° C.

* * * * *